(12) United States Patent
Chakraborty et al.

(10) Patent No.: US 7,237,030 B2
(45) Date of Patent: Jun. 26, 2007

(54) SYSTEM AND METHOD FOR PRESERVING POST DATA ON A SERVER SYSTEM

(75) Inventors: Krishnendu Chakraborty, San Mateo, CA (US); Xuesi Dong, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 939 days.

(21) Appl. No.: 10/309,709

(22) Filed: Dec. 3, 2002

(65) Prior Publication Data

US 2004/0107282 A1      Jun. 3, 2004

(51) Int. Cl.
| | |
|---|---|
| G06F 15/16 | (2006.01) |
| G06F 15/173 | (2006.01) |
| G06F 17/30 | (2006.01) |
| H04L 9/32 | (2006.01) |
| H04L 7/16 | (2006.01) |
| G06F 7/00 | (2006.01) |
| G06F 7/04 | (2006.01) |
| G06F 12/00 | (2006.01) |
| H04K 1/00 | (2006.01) |

(52) U.S. Cl. ............... 709/229; 709/203; 709/219; 709/225; 709/226; 709/239; 709/249; 726/8; 726/27; 726/30; 711/130; 707/9

(58) Field of Classification Search .......... 709/203, 709/219, 225, 226, 229, 239, 249; 726/8, 726/27, 30; 711/130; 707/9
See application file for complete search history.

(56) References Cited

U.S. PATENT DOCUMENTS 6,173,311 B1 * 1/2001 Hassett et al. ............. 709/202

| | | | |
|---|---|---|---|
| 6,381,651 B1 * | 4/2002 | Nishio et al. | 709/245 |
| 6,389,541 B1 * | 5/2002 | Patterson | 726/9 |
| 6,466,570 B1 * | 10/2002 | Low et al. | 370/352 |

(Continued)

FOREIGN PATENT DOCUMENTS

JP        2002132810 A  *  5/2002

OTHER PUBLICATIONS

Berners-Lee, T. et al. "Uniform Resource Identifiers (URI): Ge3neric Syntax," RFC 2396, Aug. 1998, pp. 1-40.*
Palme, J. et al. "MIME Encapsulation of Aggregate Documents, such as HTML (MHTML)." RFC 2557, Mar. 1999, pp. 1-28.*
Mealling, M. and Denenberg, R. "URI, URL, and URN: Clarifications and Recommendations," RFC 3305, Aug. 2002, pp. 1-11.*

(Continued)

*Primary Examiner*—Jason Cardone
*Assistant Examiner*—Melvin Pollack
(74) *Attorney, Agent, or Firm*—Osha Liang LLP

(57) ABSTRACT

A system and method for preserving POST data on a server system are presented. Embodiments of the present invention include a method for preserving POST data comprising using a generic cache agent to intercept a POST request made by a client for a resource accessible from a server, creating a URI unique to the POST request, storing the URI and POST data associated with the POST request in a cache memory, redirecting the client to an authentication URL, and after authentication, retrieving the POST data from the cache memory, creating an HTML page, the HTML page comprising the POST data, and serving the HTML page to a web server. In another embodiment of the present invention, a cache engine clears stale POST data through a LRU (least recently used) cache mechanism. The present invention provides a generic cache engine that can be plugged into any web server running any kind of web application.

30 Claims, 5 Drawing Sheets

U.S. PATENT DOCUMENTS

| | | | |
|---|---|---|---|
| 6,584,548 B1* | 6/2003 | Bourne et al. | 711/134 |
| 6,754,699 B2* | 6/2004 | Swildens et al. | 709/217 |
| 6,766,420 B2* | 7/2004 | Rawson, III | 711/133 |
| 6,785,769 B1* | 8/2004 | Jacobs et al. | 711/118 |
| 6,789,170 B1* | 9/2004 | Jacobs et al. | 711/133 |
| 6,795,917 B1* | 9/2004 | Ylonen | 713/160 |
| 6,959,420 B1* | 10/2005 | Mitchell et al. | 715/745 |
| 6,970,914 B1* | 11/2005 | Philyaw et al. | 709/217 |
| 6,987,987 B1* | 1/2006 | Vacanti et al. | 455/556.2 |
| 7,012,916 B2* | 3/2006 | Low et al. | 370/352 |
| 7,020,750 B2* | 3/2006 | Thiyagaranjan et al. | 711/141 |
| 7,039,615 B1* | 5/2006 | Gajjala et al. | 705/59 |
| 7,043,534 B1* | 5/2006 | Donnelly et al. | 709/217 |
| 7,054,912 B2* | 5/2006 | Kanai et al. | 709/213 |
| 7,086,089 B2* | 8/2006 | Hrastar et al. | 726/22 |
| 7,096,418 B1* | 8/2006 | Singhal et al. | 715/501.1 |
| 7,107,309 B1* | 9/2006 | Geddes et al. | 709/203 |
| 7,158,953 B1* | 1/2007 | DeMello et al. | 705/51 |
| 2001/0037302 A1* | 11/2001 | McFadzean et al. | 705/51 |
| 2002/0165870 A1* | 11/2002 | Chakraborty et al. | 707/206 |
| 2003/0037232 A1* | 2/2003 | Bailiff | 713/153 |
| 2003/0050918 A1* | 3/2003 | Pilkington et al. | 707/1 |
| 2003/0187935 A1* | 10/2003 | Agarwalla et al. | 709/206 |
| 2003/0200313 A1* | 10/2003 | Peterka et al. | 709/225 |
| 2004/0054854 A1* | 3/2004 | Thiyagaranjan et al. | 711/141 |
| 2004/0059719 A1* | 3/2004 | Gupta et al. | 707/3 |
| 2004/0068579 A1* | 4/2004 | Marmigere et al. | 709/242 |
| 2006/0167883 A1* | 7/2006 | Boukobza | 707/10 |
| 2006/0173959 A1* | 8/2006 | McKelvie et al. | 709/204 |

OTHER PUBLICATIONS

Mealling, M. "DDDS Part Four: The URI Resolution Application," RFC 3404, Oct. 2002, pp. 1-18.*

St. Johns, Mike. "Authentication Server," RFC 931, Aug. 1985, pp. 1-5.*

Zorn, G. and Aboba, B. "RADIUS Authentication Server MIB," RFC 2619, Jun. 1999, pp. 1-16.*

* cited by examiner

SYSTEM AND METHOD FOR PRESERVING POST DATA ON A SERVER SYSTEM

BACKGROUND OF THE INVENTION

1. Field of the Invention

The field of the invention relates to data processing. More specifically, embodiments of the present invention relate to a generic system and method for preserving post data on web and application servers.

2. Related Art

Computer systems typically include a combination of hardware (e.g., semiconductors, circuit boards, etc.) and software (e.g., computer programs). As advances in semiconductor processing and computer architecture push the performance of computer hardware higher, more sophisticated computer software has evolved to take advantage of the higher performance of the hardware.

Other changes in technology have also profoundly affected how people use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a central software application running on one computer system. As a result of sharing a software application with numerous users, policies must be defined and enforced that control the access and use of particular applications on a server system.

Referring now to Prior Art FIG. 1, a block diagram 10 of a generic server system is shown. The generic server system comprises a user 20 connected to a server 21 by a data connection 24. Typically, user 20 will access an application 22 that is stored on server 21 over the Internet. In a corporate environment, the user 20 could be connected to the server by an internal network e.g., an Intranet. In addition, server 21 stores a set of user policies in a database 23 for authenticating access to software application 22. Typically, the user policy database 23 comprises user names and associated passwords. When a user provides credentials to access secure applications, the credentials are checked against the stored values.

A browser application communicates with a web server and can request information using a number of methods. The most commonly used methods are "GET", "POST", and "HEAD." Often in web based applications, the end users are required to submit a post on forms that trigger backend servlets, CGI scripts, etc. For example, when completing an online purchase, a user is required to fill out a form containing information such as shipping address and credit card information. This form may exist on a web page.

Online purchasing, reservations, data retrievals, etc. require extensive POST operations to be submitted through HTML (Hyper Text Markup Language) forms. For example, a customer may want to purchase books at an online bookstore. The user may start putting selected items into a shopping cart used to hold items until payment is completed. After the user is satisfied with the choice of items to be purchased, the user proceeds to checkout the items and pay for them. At this point of time, the credentials of the user are verified if the user has not yet authenticated a session. This scenario is very common, most of the users that visit a web site feel it unnecessary to complete authentication unless needed. Many users browse a web site, place items into a shopping cart, and then choose for one reason or another that they will not purchase the items. Therefore, authentication is often a second thought.

Once an un-authorized user decides to purchase selected items in a shopping cart, they are rerouted to an authentication page that causes the web server to lose all the POST data. The user then needs to reenter the data in the form. In most cases, reentering information is quite annoying for the user because they have already spent a considerable amount of time filling out the HTML form (which may be multi-part comprising html, text, graphics, etc.) the first time. Though some application providers allow caching simple forms, most of the present solutions suffer because of many drawbacks.

For example, simple form caching solutions are specific to a particular web application and are not generic to any web server. In addition, schemes to save posted data on one particular web site do not work for another web site that uses a different web server or one that serves a different type of business. Furthermore, vendors have no easy way to use POST data caching that is specific for one particular application for another application even if the applications are on the same web server. The result is that most applications lock the application provider with one particular web server without flexibility to upgrade or change the brand or type of web server. Currently, there are no generic techniques or processes that can cache POST data and then later reuse it to submit a form for any web server or J2EE agents.

SUMMARY OF THE INVENTION

Accordingly, what is needed is generic solution for caching POST data on a web server that facilitates future use of the POST data to re-post a form. In one embodiment, the generic solution acts like a plug-in for any web server that is hosting any application. The framework of the generic solution may run on any platform thus providing unlimited flexibility and ease of use. The caching embodiment facilitates recalling selected form data that can be used after an authentication session without requiring the user to re-enter his or her selections.

A system and method for preserving post data on a server system are presented. Embodiments of the present invention include a method for preserving POST data comprising using a generic cache agent to intercept a POST request made by a client for a resource accessible from a server, creating a magic URI unique to the POST request, storing the magic URI and POST data associated with the POST request in a cache memory, redirecting the client to an authentication URL, authenticating the client, retrieving the POST data from the cache memory, creating an HTML page, the HTML page comprising the POST data, and serving the HTML page to a web server.

Embodiments of the present invention also include a computer implemented system for preserving POST data comprising a generic agent interface coupled to a server for intercepting an incoming POST request associated with a user, and a generic cache engine that assigns a unique identification tag to POST data associated with the POST request, stores the POST data and the unique identification tag in a cache memory, directs the user to an authentication resource, creates an HTML page comprising the POST data associated with the user, and serves the HTML page to the user.

In one embodiment, the agent (web server plug-in) offers a generic solution to post data preservation. Once POST data hits a browser, the agent interrupts the POST operation and then registers the contents of the form and the action URL in the form. The agent then redirects the request to a dummy page (non-existent page) with a magic query string (created with a unique key) that is uniquely generated for that request. Once the user has authenticated and the response is being sent to the client, the agent intercepts the request for the second time to see if the magic URL is there in the request. If the agent finds the magic URL, the agent knows it needs to find the corresponding POST data from a cache. If there is an entry for that request (corresponding to the unique key) in the post cache held by the agent, the agent will recreate the post form with invisible parameters and resubmit the POST. From then on, it is the job of the servlet or the back end script (like CGI or VB) to send back the response to the client. The back end never knows that the post data was cached by the agent and later used to recreate the POST form.

In one embodiment, the generic agent provides flexibility by allowing the user to choose the time interval for which the POST data should be held in the cache. Generally, the POST data can be very large and as a result, there is a time limit for which the user should save the POST data. The agent stores POST data in cache and then flushes it from the memory if not used in a predetermined period of time to avoid unnecessarily storing large amounts of POST data. This will prevent the agent from not using the memory in the machine for caching POST data. In addition, this feature will provide enough flexibility for the user to choose the amount of memory allocated for preserving POST data. In one embodiment of the present invention, if the memory limit is crossed by a large number of Post requests (or small number of large sized POST requests), a reaper thread will clean the LRU (least recently used) POST data entries to ensure that the POST cache size does not extend beyond the allocated memory size.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "intercepting," "receiving," "creating," "redirecting," "identifying," or the like, refer to the action and processes (e.g., process 500) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Figure 1:
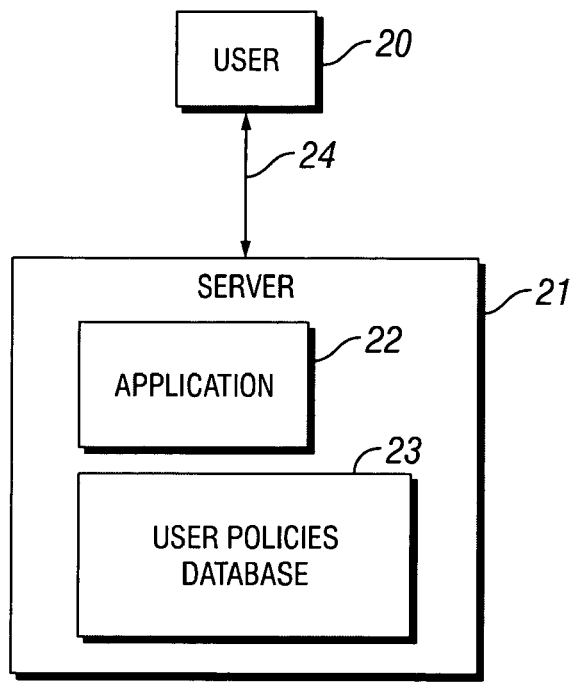
FIG. 1 is a block diagram of a prior art server system including an application stored on a conventional server available to a user over a network connection.
Figure 2:
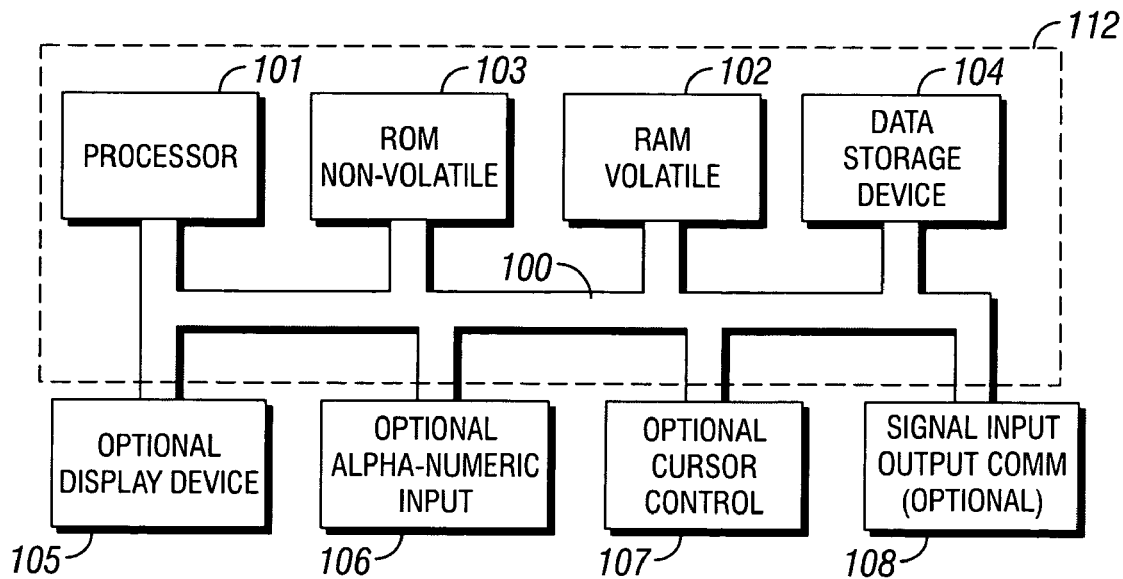
FIG. 2 is a logical block diagram of an exemplary computer system in accordance with an embodiment of the present invention.

Referring now to FIG. 2, a block diagram of exemplary computer system 112 is shown. It is appreciated that computer system 112 of FIG. 2 described herein illustrates an exemplary configuration of an operational platform upon which embodiments of the present invention can be implemented. Nevertheless, other computer systems with differing configurations can also be used in place of computer system 112 within the scope of the present invention. For example, computer system 112 could be a server system, a personal computer or an embedded computer system such as a mobile telephone or pager system.

Computer system 112 includes an address/data bus 100 for communicating information, a central processor 101 coupled with bus 100 for processing information and instructions, a volatile memory unit 102 (e.g., random access memory, static RAM, dynamic RAM, etc.) coupled with bus 100 for storing information and instructions for central processor 101 and a non-volatile memory unit 103 (e.g., read only memory, programmable ROM, flash memory, EPROM, EEPROM, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions. In one embodiment of the present invention, data storage device 104 is a cache memory.

Also included in computer system 112 of FIG. 2 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface 108, which is also coupled to bus 100, and can be a serial port. Communication interface 108 can also include number of wireless communication mechanisms such as infrared or a Bluetooth protocol.

Although the generic POST data preservation system of the present invention may be implemented in a variety of different electronic systems such as a mobile computer system, a server system, a web server, an embedded system, etc., one exemplary embodiment includes the implementation on a computer server system. It should be understood that the descriptions corresponding to FIG. 2 provide some general information about an exemplary computing system.

In one aspect, the agent (web server plug-in) offers a generic solution to preserving POST data. Once a browser makes a POST request, the agent interrupts the POST operation and then registers the contents of the form and the action URL in the form. Then the agent redirects the request to a dummy page (non-existent page) with a magic query string (created with a unique key) that is uniquely generated for that request. Once the user has authenticated and the response is being sent to the client, the agent intercepts the request for the second time to see if the magic URL is there in the request. If the agent finds the magic URL, the agent knows it needs to find the corresponding POST data from a cache. If there is an entry for that request (corresponding to the unique key) in the post cache held by the agent, the agent will recreate the post form with invisible parameters and resubmit the POST. From then on, it is the job of the servlet or the back end script (like CGI or VB) to send back the response to the client. The back end never knows that the post data was cached by the agent and later used to recreate the POST form.

The generic agent provides flexibility by allowing the user to choose the time interval for which the POST data should be held in the cache. Generally, the POST data can be very large and as a result, there is a time limit for which the user should save the POST data. The agent stores POST data in cache and then flushes it from the memory if not used in a predetermined period of time to avoid unnecessarily storing large amounts of POST data. This will prevent the agent from not using the memory in the machine for caching POST data. In addition, this feature will provide enough flexibility for the user to choose the amount of memory allocated for preserving POST data. In one embodiment of the present invention, if the memory limit is crossed by a large number of Post requests (or small number of large sized POST requests), a reaper thread will clean the LRU (least recently used) POST data entries to ensure that the POST cache size does not extend beyond the allocated memory size.

Figure 3:
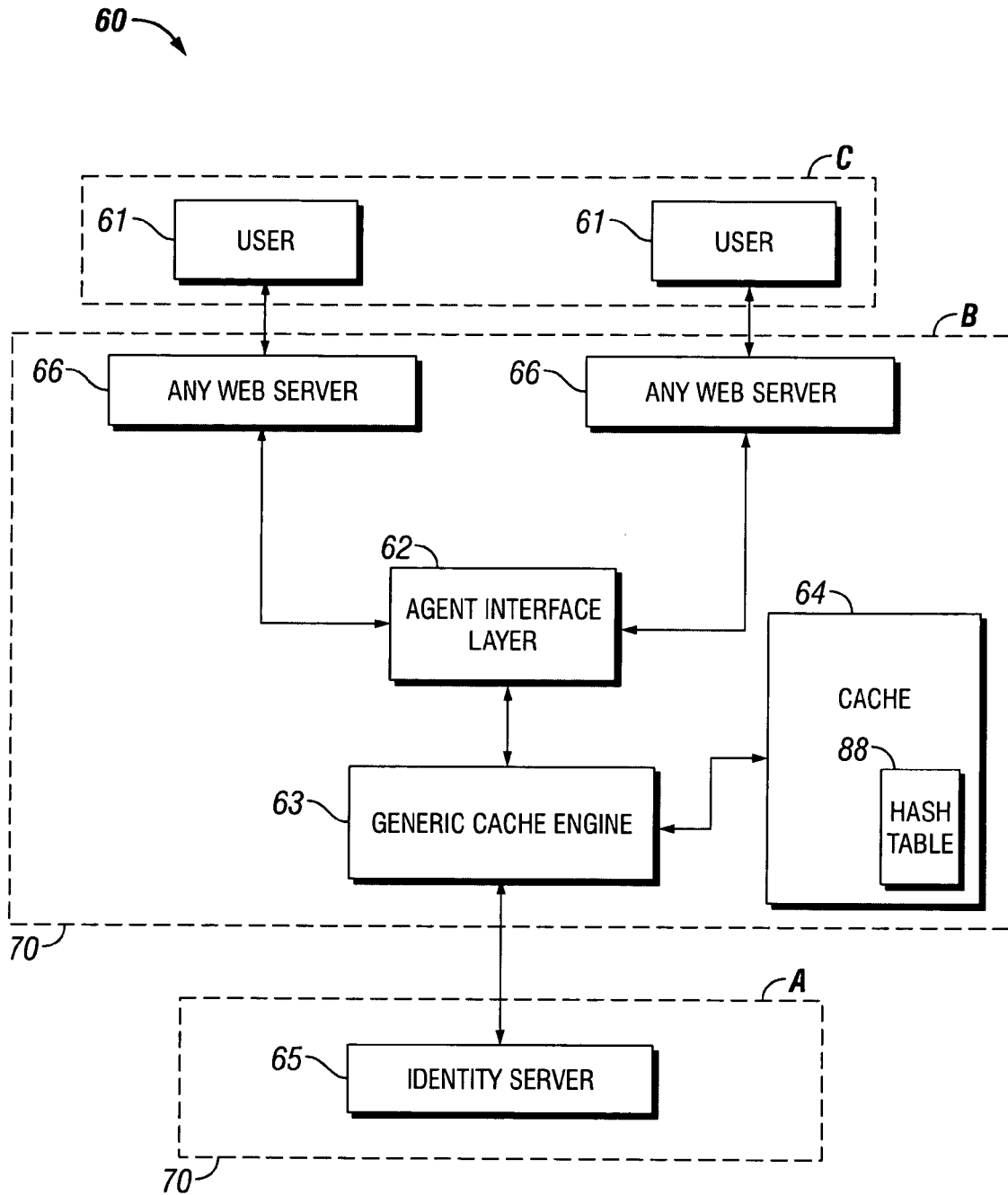
FIG. 3 is a data flow diagram of an exemplary server plug-in agent that intercepts POST requests from a user and stores them in a cache according to caching policies in accordance with an embodiment of the present invention.

FIG. 3 is a logical block diagram 60 of a server system 70 with a plug-in agent system comprising an agent interface layer 62, a generic cache engine 63, and a cache memory 64 comprising a hash table 88. The server system 70 also comprises an identity server 65, which is typically protected by a firewall and a web server system which comprises a web server 66. The two components of the policy agent are the agent interface layer 62 and the generic cache engine 63. Typically, a user 61 will request a web resource from web server 66. User 61 is labeled "C" and the notation corresponds to "C" in FIGS. 4, 5A, 5B, and 5C. In one embodiment of the present invention, the web server 66 is a web server such as Sun[TM] One web server, Apache, or Microsoft IIS, but server 66 could be any server running on any platform. In one embodiment of the present invention, the agent interface layer 62, and generic cache engine 63 are installed on a web server while the Sun[TM] One identity server is on a remote server in a secure location. In addition more than one agent interface can use the same cache engine and data store, thus making retrieval of POST data more efficient and more manageable. In accordance with embodiments of the present invention, the generic cache engine 63 is not specific to any application but is rather generic and responds to high level requests for information. On the other hand, in one embodiment of the present invention, the agent interface layer 62 may be application specific. As described further below, the generic cache engine performs evaluations that are done independent of the application program.

The agent Interface layer 62 of FIG. 3 decides if the web request requires preservation of POST data by communicating with the generic cache engine 63. Along with the POST data, a corresponding identification tag is stored in the hash table 88 in cache memory 64. If the request does not require policy enforcement, the user is directed to the resource. Conversely, if the request does require POST data preservation, the agent interface 62 intercepts the request and checks for a token or magic URI (a magic URI is an identification tag that the agent attaches to a POST request that has already been intercepted) in the header portion of the HTTP request to see if the user has established a session by previously providing credentials such as a login and password or to see if there is POST data is already stored in cache. If there is a cookie present, the cookie is validated by the generic core policy engine 63 by accessing a policy definition stored in either a cache memory 64 or a data store coupled to identity server 65. Once a session has been identified, the agent interface 62 uses the cache policies to preserve POST data for that particular user. If there is not a cookie available, the user is directed to an authentication page where credentials are required to access the particular resource or POST a form. Once the user provides allowable credentials, a cookie is set in the browser and the cookie will maintain the session between the user and the web server 66.

In one embodiment of the present invention, the agent interface performs an IP address verification to prevent users from using another's cookie on another browser to gain access to secure resources. In one embodiment of the present invention, the user POST data comprises a POST data field and an associated ID time stamp field.

The next part of the system is the generic cache engine 63 that intercepts POST actions and returns the POST data to the agent interface 62 for later use. Most of the core functionality in the engine may be shared across all web servers, thus making it generic to almost any server running on any platform. One purpose of the generic cache engine 63 is to define the policy definitions for multiple users and multiple resources, evaluate the policies and return POST data to the agent 62. The cache engine maintains a cache memory for POST data, thus reducing the time it takes to retrieve POST data. In one embodiment of the present invention, the generic agent provides flexibility by allowing the user to choose the time interval for which the POST data should be held in the cache.

Generally, the POST data can be very large and as a result, there is a time limit for which the user should save the POST data. The agent stores POST data in cache and then flushes it from the memory if not used in a predetermined period of time to avoid unnecessarily storing large amounts of POST data. This will prevent the agent from not using the memory in the machine for caching POST data. In addition, this feature will provide enough flexibility for the user to choose the amount of memory allocated for preserving POST data.

In another embodiment of the present invention, if the memory limit is crossed by a large number of POST requests (or small number of large sized POST requests), a reaper thread will clean the LRU (least recently used) POST data entries to ensure that the POST cache size does not extend beyond the allocated memory size Furthermore, in another embodiment of the present invention, the identity server 65 may be located on a different server than the agent interface 62. For example, identity server 65 could be on a remote server that is protected by a firewall in different location than the web server 66. This arrangement allows more flexibility and scalability because many times the identity server 65 is in a different location than the web server 66. In addition, more than one cache agent can share the same identity server 65, thus reducing data inconsistencies during authentication. Furthermore, having the identity server 65 in a central location allows changes to be made by simply changing one database instead of multiple data stores.

In a base form, the cache engine looks for a magic URI (a magic URI is a tag that the agent attaches to a URL to identify a POST that has already been intercepted by the agent) created by the cache engine, and if there is not a magic URI or cookie, the cache engine intercepts a POST request and stores the POST data in a cache memory so the user does not need to reenter the POST information a second time. The POST data is stored in a hash table along with a corresponding ID tag. In one embodiment of the present invention, the ID tag is a unique time stamp of when the POST was requested. Once the POST data is stored, a user is directed to an authentication page. In the URL for the authentication page, a magic URI is attached to flag the cache engine to retrieve the post data associated with the user after authentication is accomplished. Once the user has provided credentials that satisfy an authentication, the POST data is retrieved and an HTML page is created comprising the POST data associated with the user. The process is transparent to the user and to the web server. In one embodiment of the present invention, the cache engine eliminates data from the cache based on the least recently used basis. When a memory capacity is reached, the data that has not been used for the longest period of time is the first to be eliminated to make room for new POST data. In an alternative embodiment of the present invention, POST data is cleared from a cache memory after a predetermined period of time.

Figure 4:
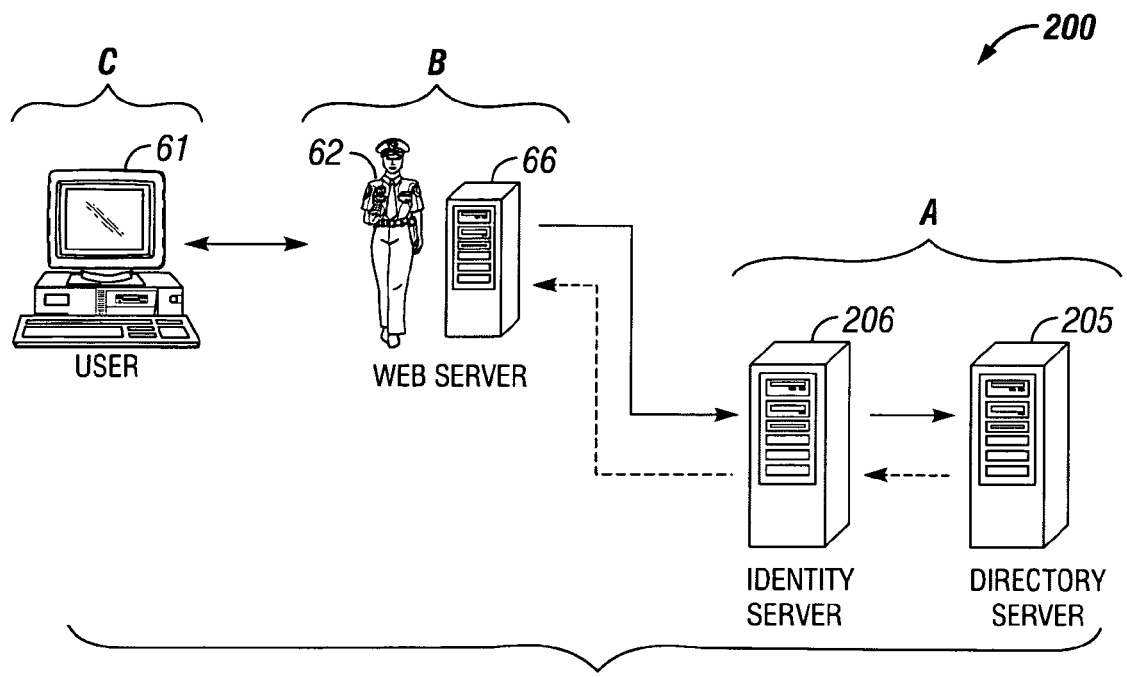
FIG. 4 is an illustration of an exemplary server system including a web browser, web server, and an identity server that uses a plug-in server agent to intercept POST requests and cache form information in accordance with an embodiment of the present invention.

FIG. 4 is an illustration of a server system 200 showing a communication architecture between the cache agent and a web server 66. System 200 comprises a user or web browser 61 (C), web server 66 (B), agent interface 62 (B), Sun[™] One identity server 206 (A) and a Sun[™] One directory server 205 (A). When a user 61 wants to access a resource on the Internet, a web browser (A) is used to communicate with a web server 66. When a user tries to access a resource, e.g., a web page, the web browser makes an HTTP request to the web server 66 to be directed to the resource. When submitting a form, the web browser makes a POST request. With the agent installed, the agent interface 62 intercepts the incoming POST request and checks if the user is authorized to access the resource by looking for a cookie or a magic URI. In the server system 200, the agent interface 62 and the cache engine are 63 are on the web server 66. In system 200 of FIG. 4, the data store that the identity server 206 accesses is on a separate directory server 205. In one embodiment of the present invention, the identity server 206 is coupled to a cache memory 64 as described in FIG. 3 so it does not have to retrieve authentication data from the identity server, thus decreasing the time to authenticate users.

In one embodiment of the present invention, a RADIUS or Certificate module is used to authenticate the user's credentials. In this case, the credentials are not verified by the directory server 205, but are verified by the appropriate authentication module (e.g., a RADIUS module). Once the user's credentials are properly authenticated, the cache agent examines the requested URL to see if a cookie and the magic URI is present. If the cookie is present (and valid) and magic URI is not present, the agent interface intercepts any POST requests and stores the POST data in a cache memory.

Figure 5A:
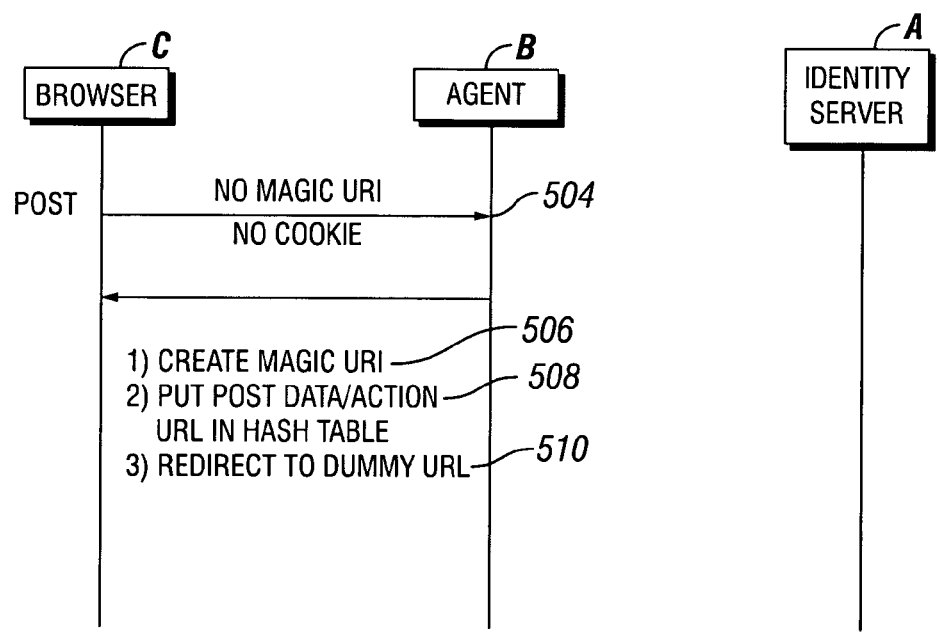
FIG. 5A is a timing diagram illustrating an exemplary communication pathway between a browser, an agent and an identity server during a POST request in accordance with an embodiment of the present invention.
Figure 5B:
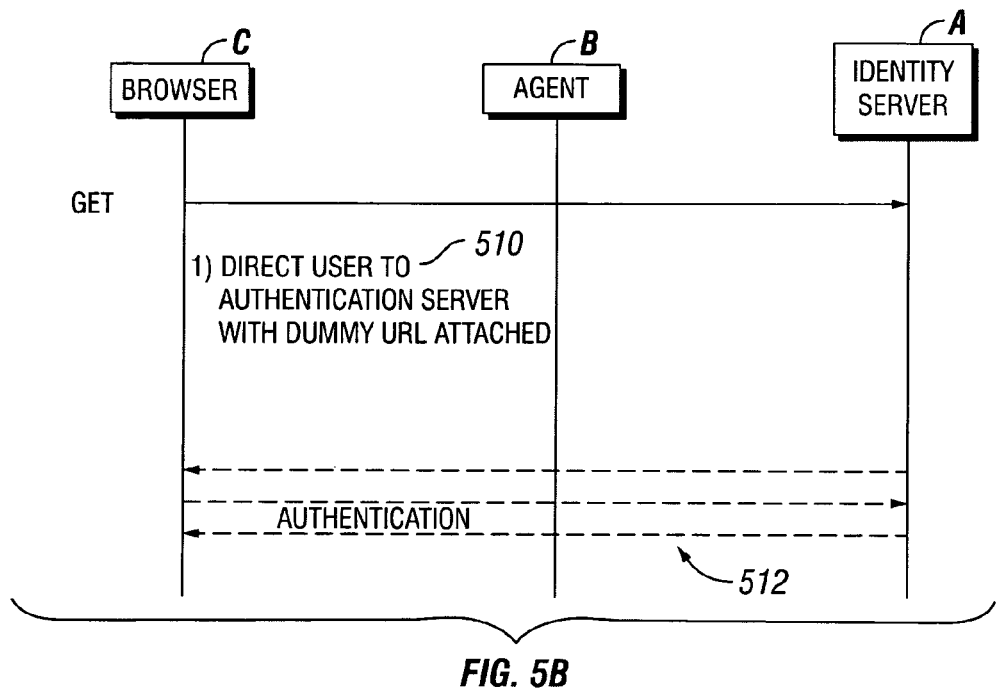
FIG. 5B is a timing diagram illustrating an exemplary communication pathway between a browser, an agent and an identity server during a GET request and authentication in accordance with an embodiment of the present invention.
Figure 5C:
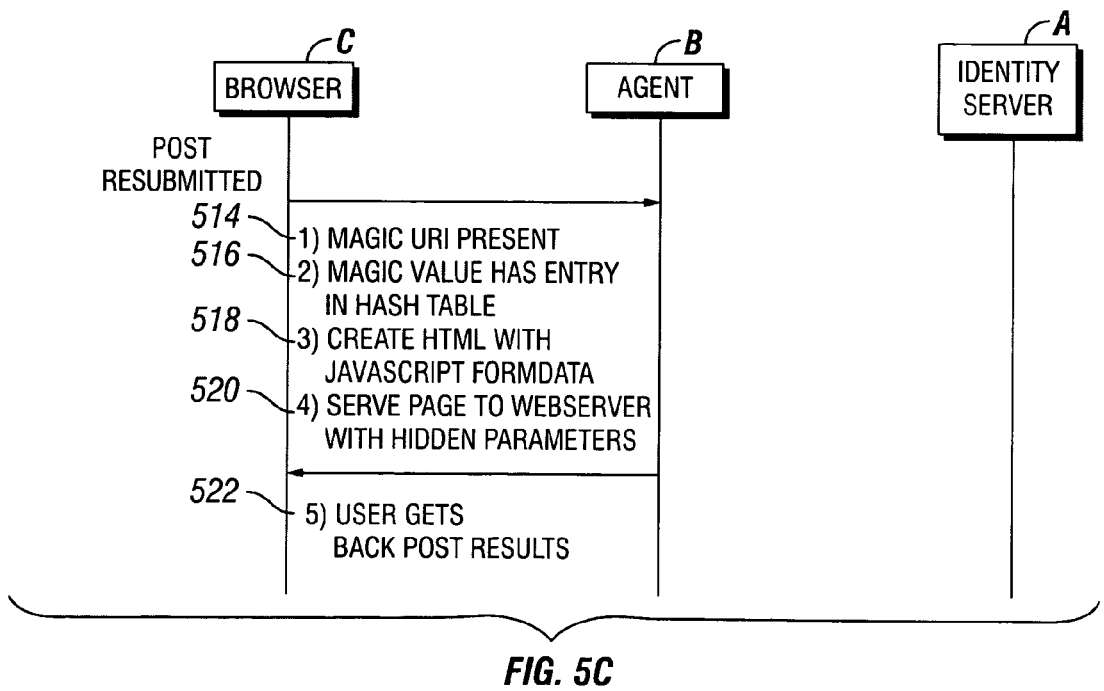
FIG. 5C is a timing diagram illustrating an exemplary communication pathway between a browser, an agent and an identity server when POST information is retrieved from a cache in accordance with an embodiment of the present invention.
Figure 6:
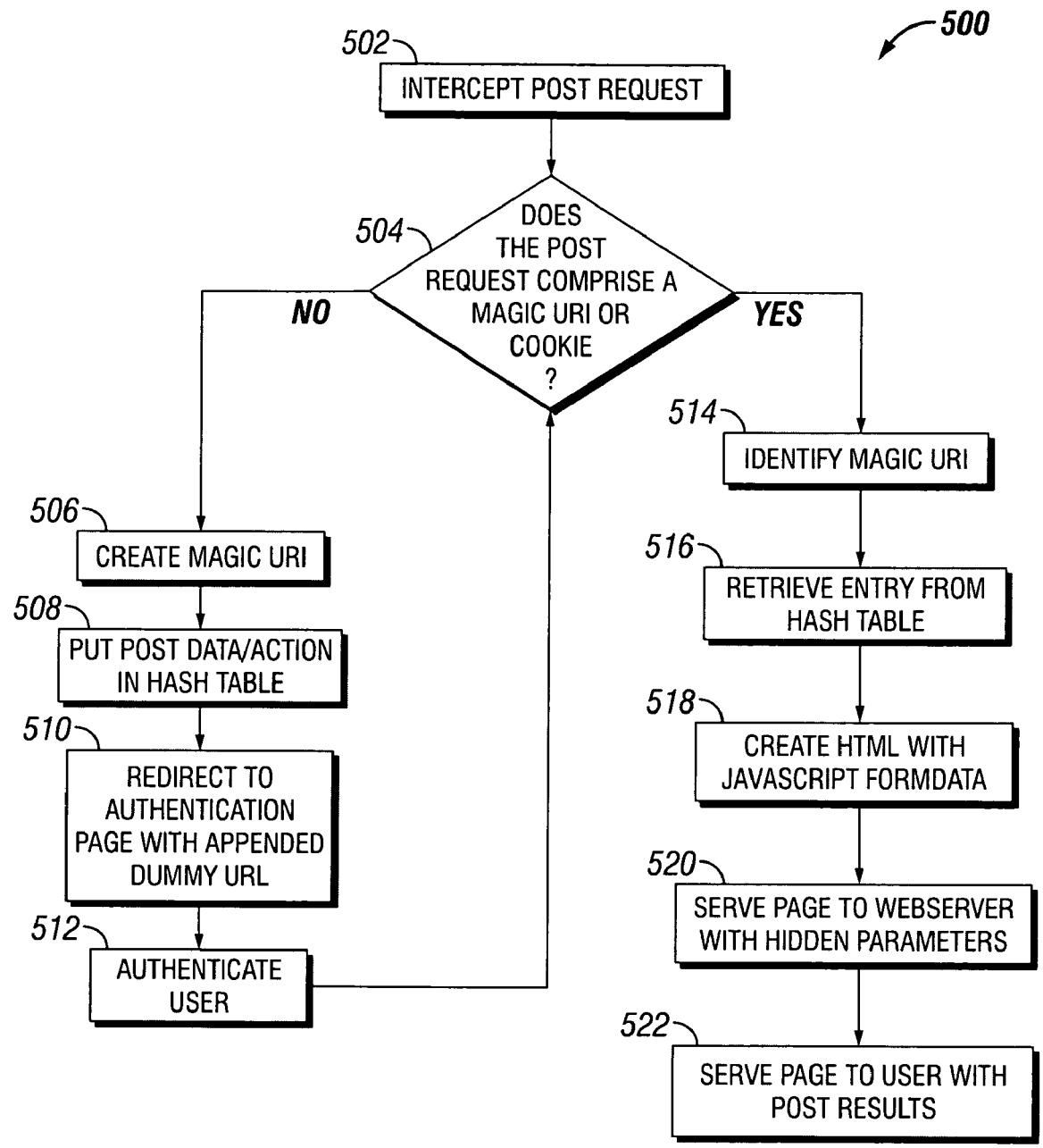
FIG. 6 is a flow diagram of an exemplary process wherein a plug-in agent intercepts a POST request and stores the POST data in a cache in accordance with an embodiment of the present invention.

FIGS. 5A–5C provide illustrations of a communication pathway between elements in a networking environment according to embodiments of the method of the present invention as set forth in the flow chart of FIG. 6. For purposes of clarity, the following discussion will utilize the illustrations of FIGS. 5A–5C in conjunction with the flow chart 500 of FIG. 6 to clearly describe the embodiments of the present invention. Flow chart 500 of FIG. 6 begins with step 502. At step 502, the present embodiment intercepts a POST event.

FIG. 5A is a diagram illustrating an exemplary communication pathway between a browser, an agent and an identity server during a POST request in accordance with an embodiment of the present invention. The first step 504 is for the agent interface (B) to intercept an POST request made by a browser (A) and examine the header portion of the POST request for a cookie or magic URI. For example, a user reaches a page that needs a POST (e.g., a user submits a form on a web page). For illustrative purposes, assume the URL for the webpage is http://user_machinename.siroe.com:80/post.html.

On this particular page, there can be some data fields to enter data such as name, address, etc. Once a user enters the data and submits the page, the agent intercepts the request. Then the agent tries to figure out if there is a valid cookie for this request. If it is the first time a user is accessing the page, there will not be a valid cookie for the request. Next, the agent tries to figure out if the request is a POST.

If the agent finds that the request is a POST and there is no magic URI (the magic URI is a tag that the agent attaches to a URL to identify a POST previously intercepted) with the request, the agent knows that the POST is coming for the first time. Once the agent knows the POST request is coming in for the first time, the agent (B) creates a magic URI in step 506. The magic URI will uniquely identify the POST request. For example, the magic URI corresponding to the URL for the web page mentioned above could look like: http://user_machinename.siroe.com:80/dummypost?sunpostpreserve=2002-06-2716:41:16.460. The redirect URL does not need to be a real URL. However, the value of the query string "sunpostpreserve" must be unique. This key is generated from mangling the present time stamp on the machine at which the POST was registered.

In one embodiment of the present invention, to ensure that the key does not get duplicated, a time stamp is generated and locked with a semaphore, thus ensuring that in a multi-threaded environment, the ID key generated for each POST will be unique. For example, in this case, the ID key is 2002-06-2716:41:16.460.

Then in step 508, the agent stores the POST data in a hash table along with a corresponding identification tag. The agent will read the contents of the POST data submission page and create an array of bytes. Once the encoded data is collected, it is stored in a hash table with the unique key that was generated for the POST. In addition, the destination URL of the POST (which can be a URL to a servlet or cgi script) is also stored with this entry in the hash table. Finally, in step 510, the agent performs a redirect to the authentication server with the dummy URL (that was constructed in step 506) appended to it. For example, using the above example, the final URL for the destination page will look like:

http://authenticationserver.siroe.com.:8080/amserver/UI/
    login?goto=http://user_m achinename.siroe.com:80/dummypost?sunpostpreserve=2002-06-2716:41:16.460.

FIG. 5B is a diagram illustrating an exemplary communication pathway between a browser, an agent and an identity server during a GET request and authentication in accordance with an embodiment of the present invention. The browser (C) communicates with an authentication server to authenticate the user in step 512. In one embodiment of the present invention, the authentication server is a Sun[TM] One identity server. Once a user has authenticated with the correct credentials (such as a login and password), the request goes back to the browser from where the user submitted the request. The agent intercepts the request through a server application function (SAF) for the second time.

FIG. 5C is a diagram illustrating an exemplary communication pathway between a browser, an agent and an identity server when POST information is retrieved from a cache in accordance with an embodiment of the present invention. In step 514, the agent identifies a magic URL embedded in a POST request URL. For instance, in the above example, the magic URI is "dummypost." Once the agent identifies a magic URI, the agent knows that this is a POST whose data may be in a cache memory. In step 516, the agent looks to a query string in the URI (sunpostpreserve=key) to find the unique key that corresponds to the POST data in the hash table. If the key value is not null and there is an entry for the key in the agent hash table (POST cache), the agent retrieves the data from the hash table. Now in step 518, the agent recreates the POST page and in step 520, submits the page to the web server.

In one embodiment of the present invention, the agent recreates the POST page in the form of a JavaScript and then submits the page to a web server. In step 522, a browser application receives the page from the web server and serves the page comprising the POST data to a user. The output from the servlet or cgi script is the html page with the results of the POST. For the end user, the whole process of storing the POST data and later resubmitting it is totally transparent.

In one embodiment of the present invention, the agent enforces a time interval for which a POST data entry should be stored in the cache. This interval decides how long the POST data can stay valid in the web server cache. Since POST data can be large and the user might get busy doing something else after submitting a POST, holding large cache files for long periods of time does not make the web server as efficient as it could be. In addition, every web server has a session time out interval. In one embodiment of the present invention, the time out interval ensures that the present session does not stay idle for a long period of time. If the session time expires, all information pertaining to the session is dropped. In another embodiment of the present invention, the time interval for ending a session and for dropping POST entries in cache are application specific.

In regard to the size of POST data, the POST data can be very large and in one embodiment of the present invention, there is a size and/or time limit to which the agent should hold on to the data and then flush it from memory. This will prevent the agent from not using the memory in the machine for caching POST data. In addition, this will provide flexibility to the user by allowing a specific quantity of memory allocated to POST data preservation. If the memory allocation is crossed by a large number of POST requests (or small number of large size POST requests), the agent will clean the LRU (least recently used) POST data entries and ensure that the POST cache size does not cross the allocated size limit. In one embodiment of the present invention, the user can enter the parameters that specify the maximum memory that can be used to hold POST data in the web server. The size of this variable can be dependent on the specific application and specific to a particular web server to ensure optimization of any web server environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for preserving post data comprising:
    using a generic cache agent to transparently intercept a post request made by a client for a resource accessible from a server;
    creating a URI unique to said post request by said generic cache agent;
    storing post data associated with said post request in a cache memory;
    redirecting said client to an authentication URL to authenticate said client;
    after authentication, retrieving said post data from said cache memory; and
    creating an HTML page comprising said post data.

2. The method as described in claim 1 wherein said generic cache agent works independent of a web browser used by said client.

3. The method as described in claim 1 further comprising monitoring said cache memory and clearing said post data based on preset parameters.

4. The method as described in claim 3 wherein a preset parameter is clearing least recently used (LRU) post data.

5. The method as described in claim 3 wherein a preset parameter is clearing post data after a predetermined period of time.

6. The method as described in claim 1 wherein a size of said cache memory is specific to a particular application.

7. The method as described in claim 1 wherein a size of said cache memory is specific to a particular web server.

8. The method as described in claim 1 wherein said URI comprises a unique time stamp corresponding to the time said post request was made.

9. A computer implemented system for preserving post data comprising:
a generic agent interface coupled to a server for intercepting an incoming post request associated with a user; and
a generic cache engine that assigns a unique identification tag to post data associated with said post request, stores said post data and said unique identification tag in a cache memory, redirects said user to an authentication resource, subsequent to authentication creates an HTML page comprising said post data and, serves said HTML page to said server.

10. The computer implemented system as described in claim 9 wherein said unique identification tag is a time stamp that corresponds to the time said post request was submitted.

11. The computer implemented system as described in claim 9 wherein said unique identification tag is an IP address that corresponds to the location of a web browser associated with said post request.

12. The computer implemented system as described in claim 9 wherein said generic cache engine monitors the amount of memory used to store post data.

13. The computer implemented system as described in claim 12 wherein said generic cache engine clears from said cache memory post data that is least recently used (LRU).

14. A computer readable medium comprising instructions that when executed implement a method for preserving post data, said method comprising:
using a generic cache agent to transparently intercept a post request made by a client to a server;
creating a URI unique to said post request by said generic cache agent;
storing post data associated with said post request in a cache memory;
redirecting said client to an authentication URL to authenticate said client;
after authentication, retrieving said post data from said cache memory; and
creating an HTML page comprising said post data.

15. The computer readable medium as described in claim 14 wherein said generic cache agent works independent of the web browser used by said client.

16. The computer readable medium as described in claim 14 wherein said method further comprises monitoring said cache memory and clearing said post data based on preset parameters.

17. The computer readable medium as described in claim 16 wherein a preset parameter is clearing least recently used (LRU) post data.

18. The computer readable medium as described in claim 16 wherein a preset parameter is clearing post data after a predetermined period of time.

19. The computer readable medium as described in claim 14 wherein a size of said cache memory is specific to a particular application.

20. The computer readable medium as described in claim 14 wherein a size of said cache memory is specific to a particular web server.

21. The computer readable medium as described in claim 14 wherein said URI comprises a unique time stamp corresponding to the time said post request was made.

22. A method comprising:
in response to a web page submission from a user, intercepting an associated request containing post data by a generic cache agent and determining whether said request contains a valid identifier; and
when said request does not contain said valid identifier, associating with said request a particular URI that is unique to said request, wherein said URI is generated by said generic cache agent, storing said post data in a cache memory according to said URI and redirecting said request to an authentication page to authenticate said user;
in response to authentication of said user, intercepting said request a second time, locating said URI in said request and obtaining said post data from said cache memory using said URI; and
recreating said web page containing said post data.

23. A method as described in claim 22 further comprising submitting said recreated web page to a web server.

24. A method as described in claim 22 wherein said cache memory is a hash table indexed by said URI.

25. A method as described in claim 22 wherein said valid identifier is created after proper authentication of said user.

26. A method as described in claim 22 further comprising: authenticating said user; and transferring said request back to a browser from where said user generated said request, wherein said request is intercepted for said second time.

27. The method as described in claim 22 further comprising monitoring said cache memory and clearing said post data based on preset parameters.

28. A web server plug-in for preserving post data comprising:
a generic agent interface that can plug into any a web server for intercepting a post request made by a web browser, and identifying a URI associated with said post request; and
a generic cache engine for redirecting a user of said web browser to an authentication URL to authenticate said user, and after authentication, retrieving post data associated with said post request from a cache memory, creating an HTML page comprising said post data, and serving said HTML page to said web server,
wherein said URI is generated by said generic cache engine.

29. The web server plug-in as described in claim 28 wherein said generic agent interface works independent of the web browser used to send said post request.

30. The web server plug-in as described in claim 28 wherein said generic cache engine monitors a size of said cache memory and clears said post data from said cache memory after a predetermined period of time.

* * * * *

UNITED STATES PATENT AND TRADEMARK OFFICE
CERTIFICATE OF CORRECTION

PATENT NO. : 7,237,030 B2  
APPLICATION NO. : 10/309709  
DATED : June 26, 2007  
INVENTOR(S) : Krishnendu Chakraborty et al.

Page 1 of 1

It is certified that error appears in the above-identified patent and that said Letters Patent is hereby corrected as shown below:

In the Claims:

In Claim 28, column 12, line 47, the word "any" should be deleted.

Signed and Sealed this

Twentieth Day of November, 2007

JON W. DUDAS  
*Director of the United States Patent and Trademark Office*